United States Patent [19]

Soderholm

[11] Patent Number: 4,613,762
[45] Date of Patent: Sep. 23, 1986

[54] OUTPUT RESPONSIVE FIELD CONTROL FOR WIND-DRIVEN ALTERNATORS AND GENERATORS

[75] Inventor: Leo H. Soderholm, Ames, Iowa

[73] Assignee: The United States of America as represented by the Secretary of Agriculture, Washington, D.C.

[21] Appl. No.: 680,615

[22] Filed: Dec. 11, 1984

[51] Int. Cl.$^4$ ............ F03D 9/00; H02P 9/14
[52] U.S. Cl. .................. 290/44; 290/55; 322/35
[58] Field of Search ......... 290/43, 44, 55; 322/29, 322/31, 35

[56] References Cited

U.S. PATENT DOCUMENTS

| | | | |
|---|---|---|---|
| 1,366,844 | 1/1921 | Snee, Jr. | 290/44 |
| 1,778,793 | 10/1930 | Constantin | 290/44 |
| 2,118,124 | 5/1938 | Weeks | 290/44 |
| 2,152,576 | 3/1939 | Weeks | 290/44 |
| 2,178,679 | 11/1939 | Claytor | 290/44 |
| 3,974,395 | 8/1976 | Bright | 290/44 |
| 4,095,120 | 6/1978 | Moran et al. | 290/44 |
| 4,146,264 | 3/1979 | Korzeniewski | 290/44 |
| 4,160,170 | 7/1979 | Harner et al. | 290/44 |
| 4,168,439 | 9/1979 | Palma | 290/44 |
| 4,331,881 | 5/1982 | Soderholm et al. | 290/44 |

FOREIGN PATENT DOCUMENTS 52-57926  5/1977  Japan .................. 322/35

Primary Examiner—B. Dobeck
Assistant Examiner—Sharon D. Logan
Attorney, Agent, or Firm—M. Howard Silverstein; David G. McConnell; Curtis P. Ribando

[57] ABSTRACT

The field voltage of a wind-driven alternator or generator is automatically controlled in response to the output voltage developed in the load with the objective of always maintaining the maximum power output. In this manner, the tip-speed/wind-speed ratio is indirectly maintained at an optimum constant value, thereby optimizing the performance of the machine without the need to continuously and precisely monitor the wind speed and rotational speed.

7 Claims, 1 Drawing Figure

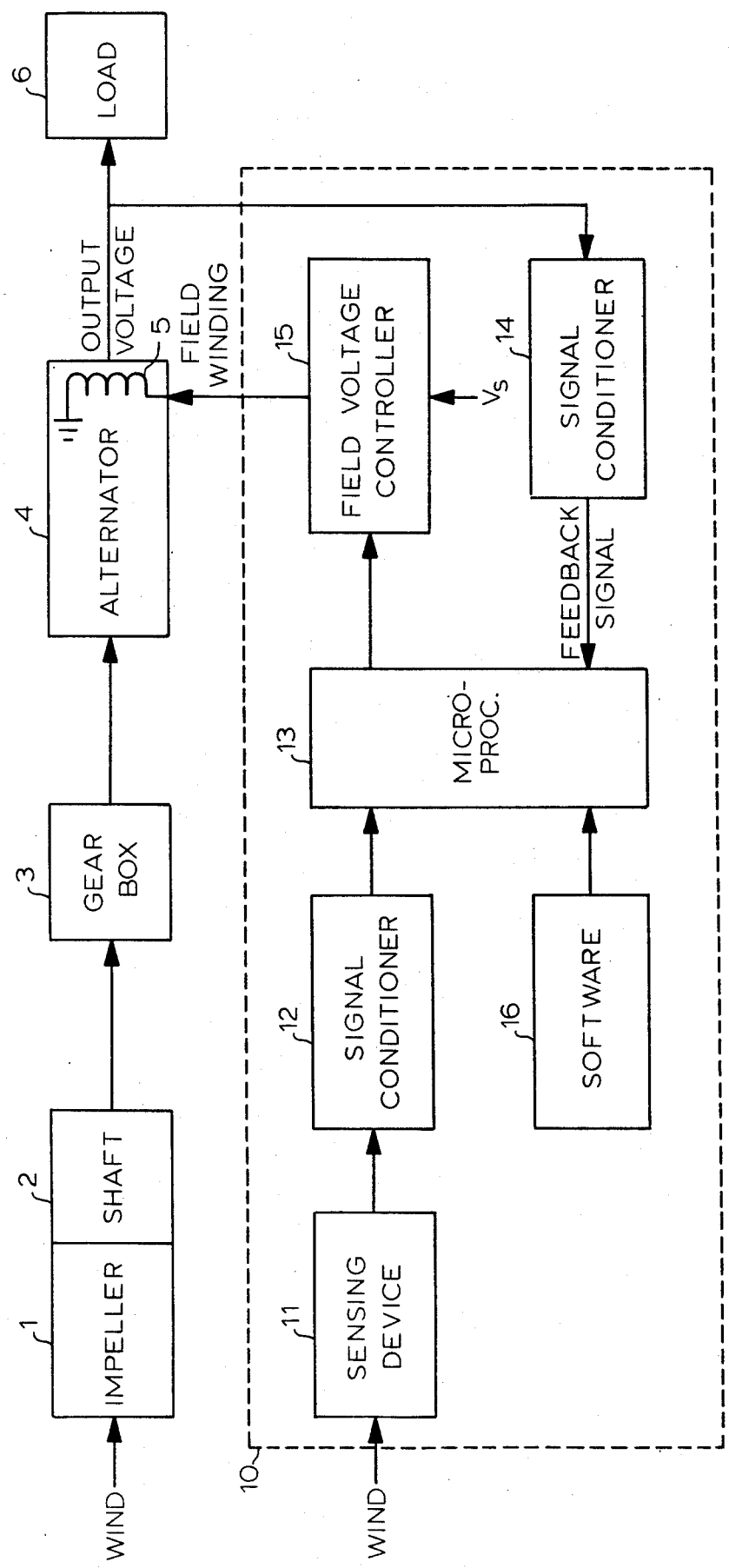

OUTPUT RESPONSIVE FIELD CONTROL FOR WIND-DRIVEN ALTERNATORS AND GENERATORS

BACKGROUND OF THE INVENTION

1. Field of the Invention

The performance of a wind machine as related to power output is a function of the efficiency at which the machine extracts energy from the windstream. This phenomenon can be expressed as $C_p = P_o/P_w$ where $C_p$ is the power coefficient or coefficient of performance, $P_o$ is the power output, and $P_w$ is the power in the windstream. Kinetic theory dictates that the maximum value for $C_p$ is 59%. Tha actual value is in part a function of the airfoil characteristics and configuration. For a given design, $C_p$ is also dependent upon the rotational velocity of the airfoil, measured at its radial extremity or tip, in relation to the free-flow wind speed. This relationship is commonly referred to as the tip-speed/wind-speed ration (TS/WS), or simply the tip-speed ratio.

Wind energy conversion systems that extract energy from the wind to produce electrical power often use self-excited alternators to supply alternating current (AC) to stand-alone resistance heating systems or to be rectified as an input for synchronous inverters. Generally, these systems will obtain maximum efficiency and power output from a given wind regime if their tip-speed ratio can be maintained at an optimum constant value over the range of wind speed encountered.

Since the wind speed at a given site tends to fluctuate, it is apparent that failure of an airfoil to react to such fluctuations would have a substantial impact on the operational efficiency of the machine. This invention relates to a control system for responding to changes in wind speed so as to maintain a machine's operation at substantially peak performance.

2. DESCRIPTION OF THE PRIOR ART

Recognition of the advantage of improving wind system efficiency by modifying wind system control has been demonstrated by a number of previous approaches. The variable-pitch or variable-geometry wind turbine has been used in the prior art both to control rotational speed of the wind turbine and to increase the amount of energy extracted from the wind. Control of rotational speed using variable-pitch wind turbines has been used in some prior art devices to provide a constant rotational speed for a wide range of actual wind speeds which allows an alternator coupled to the wind turbine to provide a fixed output frequency and voltage. Not only do such devices fail to extract an optimum amount of energy from the wind, the variable-pitch, variable-geometry wind turbine is expensive, requires complex mechanical devices for proper operation, and failure of the complex mechanical controls can cause high-rotational-speed-induced failure in high winds which can cause extensive damage to equipment and possible injury to individuals. Thus, for optimum reliability, simplicity, and cost, it is desirable to use a fixed-pitch or fixed-geometry wind turbine if such a device can be made to operate in an efficient manner.

Moran et al., U.S. Pat. No. 4,095,120, teaches a system adaptable for use with a fixed blade turbine for improving the efficiency of a wind-driven generator. This system includes a generator speed sensor which cooperates with appropriate circuitry for incrementally controlling the field current. In U.S. Pat. No. 3,974,395, Bright also shows a field control system for a wind-driven electrical generator. Bright employs a tachometer coupled to the impeller shaft for generating an output signal representative of wind velocity. This signal is applied to a field control circuit, thereby adjusting the field current of the generator. Korzeniewski in U.S. Pat. No. 4,146,264 describes a similar approach for varying the loading of a wind-driven electric generator by sensing the rotational speed of the generator and varying the field of the generator in a stepwise fashion. A limitation characteristic of the systems of Moran et al., Bright, and Korzeniewski is that the tachometer signal in each case is not necessarily indicative of the actual wind speed, insofar as the rotational speed of the impeller or shaft is influenced by the load on the generator and therefore the field current is not necessarily correlated to the optimum operational parameter of tip speed to wind speed.

Japanese patent, Kokai No. 52-57926, controls the generator excitation current in a wind-driven machine for charging batteries in response to signals representing the actual output current and the cube of the wind speed. Soderholm et al., U.S. Pat. No. 4,331,881, teach a method of maximizing the power extracted from the wind by exercising control over a generator field so as to maintain a nearly constant tip-speed ratio. In addition to the circuitry for measuring the rotational speed, this system requires a transducer for accurately measuring the wind speed. The rotational speed and wind speed are continuously monitored and compared to one another so as to cause an adjustment to the field voltage when an imbalance occurs.

SUMMARY OF THE INVENTION

I have now discovered a method and apparatus offering a simpler and more cost-effective approach than those of the prior art for operating a wind machine at maximum efficiency. The system is designed to indirectly maintain the tip-speed ratio and, therefore, maximum wind system efficiency at a substantially constant optimum value by controlling the field voltage in response to the output voltage of the generator. A feedback signal representing the alternator output voltage is periodically generated and successive signals are compared to one another. In response to the comparison, a signal is then generated to the field control for adjusting the field voltage by an increment or decrement, whereby the direction of adjustment is in the same direction as the previous adjustment if the previous adjustment resulted in an increase in output voltage, and it is in the direction opposite to the previous adjustment if the previous adjustment resulted in a decrease in output voltage. In this manner, the output voltage, and thus the power output, is maximized as a function of the power in the wind, but independent of any measurement other than the output itself. At the commencement of operation, the initial field voltage can be selected as a function of the approximate wind velocity and thereafter adjusted either upwardly or downwardly. Further adjustments will be made in accordance with the procedure described above.

In accordance with this discovery, it is an object of the invention to provide a system for maximizing the overall efficiency of wind machines which do not require a constant output voltage or frequency from the generator.

Another object of the invention is to provide a control system which will impart to wind machines with fixed blade impellers many of the purported advantages attributed to variable-pitch impellers without the associated problems previously described.

It is also an object of the invention to provide a wind-machine control system which obviates the need for sophisticated and highly accurate devices for measuring the wind velocity and rotational velocity.

A further object of the invention is to continuously and precisely match the load on a wind machine to the power available in the wind strictly in response to the generator output voltage.

Other objects and advantages of this invention will become readily apparent from the ensuing description.

BRIEF DESCRIPTION OF THE DRAWING

FIG. 1 is a block diagram depicting the operation of the invention.

DETAILED DESCRIPTION OF THE INVENTION

The category of wind machines for which the invention is particularly adapted is inclusive of most conventional fixed blade impeller-driven types wherein the energy of the wind is converted to the torque of a rotatable shaft which drives an electrical generator. Though the advantages of the invention would be somewhat negated, the novel device could also be used on machines with variable-pitch impellers. While it is envisioned that the instant invention could be used for controlling almost any type of AC or DC generator, it is understood that because of the variable speed of the machine, it would not be practical to employ an induction generator except in cases where the generator was used in a self-excited mode.

Another requirement for application of the invention is that the power developed in the load be correlated to the voltage applied to the load. For example, for a fixed resistance heating load, the power is related to the voltage by the formula $$P = V^2/R$$

where
 P = power developed in the load (watts);
 V = voltage applied to the load (volts); and
 R = load resistance (ohms).

In this instance, the power output is a direct function of the output voltage from the generator, and therefore maximum power will be obtained if the voltage output of the generator is maintained at its maximum value. Similar considerations apply to rectification of the output voltage of an alternator and its application is directly related to the applied voltage. For purposes of illustration, the ensuing description will describe the control of an alternator.

The principle of the system involves taking periodic samples of output voltage and determining if incrementing or decrementing the field voltage will produce a higher voltage than the previous sample taken before the field voltage change. For example, if incrementing the field voltage produces an increase in output voltage, the field voltage is again incremented and the output voltage checked to see if it has been further increased. If so, further increments of field voltage are made until a decrease in output voltage is obtained, which would indicate that the rotational speed has been reduced below the optimum value, or the wind speed had diminished and the load presented to the wind system needed to be reduced. If the adjustment in field voltage produces no change in output voltage, or if the change in output voltage is less than a preset amount, then the field voltage is temporarily held constant until the output voltage deviates by that amount from the value resulting from the previous adjustment.

Referring to FIG. 1, the wind drives impeller 1 which transfers the wind's energy into the torque of rotatable shaft 2. In the typical arrangement, a gear box 3 or some other conventional type of transmission is employed in order to step up the rotational velocity to the extent necessary for the output of alternator 4 to be at the approximate desired frequency for purposes of load 6. The voltage imparted to winding 5 of alternator 4 is controlled by field control device 10 as follows.

The wind velocity can optionally be measured by any conventional sensing device 11 such as a 3-cup anemometer, a hot-wire anemometer, a sonic anemometer, a thermistor, or other means designed to produce an electrical signal indicative of the wind speed. The purpose of measuring the wind speed is twofold: to determine when the wind is within the operable range of the machine; and to obtain an approximation of the wind speed at the time operation is commenced so as to select an appropriate field voltage to apply to the field winding. Because accurate measurement of the wind speed is not a critical factor, the objects of the invention are met by employing an inexpensive device such as a thermistor which will cool in proportion to the wind speed. Signal conditioner 12 designed for use in combination with sensing device 11 is intended to remove ripple, transient and noise voltages from the signal emitted by the sensing device and to provide a readable input signal to the microprocessor 13. Alternatively, the system can be programmed to initially apply a predetermined voltage to the winding, and then to enter the search mode for seeking the optimum field voltage.

Input to microprocessor 13 also includes a feedback signal derived from the alternator output and representing the voltage applied to the load 6. This signal is conditioned by signal conditioner 14 in the same manner as that from sensing device 11.

Microprocessor 13 is programmed with software 16 to perform two principal functions. One is to compare successive feedback signals from the alternator output to determine the effect of the previous adjustment of the field voltage, and the other is to signal to controller 15 the direction of the subsequent adjustment. Controller 15 responds to the microprocessor by adjusting the voltage source $V_s$ in proportion to the signal, thereby controlling the field voltage to winding 5 of alternator 4. It is readily apparent that with a fixed resistive load or a load that varies with applied voltage on the alternator, the load imparted to the impeller would be proportional to the field voltage. As the load on the impeller is increased, the tip speed tends to decrease and vice versa. Therefore, by varying the voltage on winding 5 in response to the output signal from microprocessor 13, the load on impeller 1 can indirectly be controlled for maintenance of the proper tip speed in relation to the wind speed. By virtue of this mechanism, the system will effectually accommodate changes in the instantaneous wind speed as well as changes in the impeller speed caused by the wind and the load imparted by the alternator.

When the system is equipped for sensing the wind speed as in the embodiment illustrated in FIG. 1, the microprocessor is also advantageously used to initiate startup and shutdown of the machine within predetermined limits of wind speed. It is, of course, understood that discrete analog and digital circuits could be substituted for the microprocessor for carrying out the logic of the aforementioned operations.

OPERATION OF THE INVENTION

The following description illustrates the operation of a preferred embodiment of the invention.

A signal representing the approximate wind speed is generated by sensing device 11 and is compared in microprocessor 13 to a set of preprogrammed parameters to determine if the speed is within the operable range. It is understood that the programming can be designed to accommodate either instantaneous speeds or speeds taken over a given time interval. If the wind speed is below a specified lower limit, the field voltage remains off. If the wind speed is in the normal operating range, controller 15 applies voltage to the winding 5 in accordance with a preprogrammed "look-up" table which correlates the field voltage needed for a given output power to the approximation of the power available in the wind. Once the field voltage has stabilized, the output from alternator 4 that is applied to the load is sampled by microprocessor 13. The search mode is then initiated by arbitrarily changing the field voltage either up or down. The output voltage is again sampled and the logic described above for making further adjustments to the field is thereafter followed.

In order to insure that the machine continues to operate within the intended parameters, it is advisable to program the system for periodically checking the wind speed and engaging the prescribed procedure for shutdown as necessary. As a redundant precaution, provision may also be made for periodically sampling the output voltage in the event of an erroneous signal from the sensing device 11. If at any time the wind speed or output voltage fails to meet the minimum threshold for efficient operation, the field voltage is turned off to conserve energy. Should the wind speed or output voltage exceed the maximum threshold, then a brake and shutdown routine would be initiated to stop the machine for purposes of protection and safety. An optional delay will prevent restart in the event of a temporary lull in the excessive wind condition.

It is understood that the foregoing detailed description is given merely by way of illustration and that modification and variations may be made therein without departing from the spirit and scope of the invention.

I claim:

1. A control device for operating a wind machine at maximum efficiency by maintaining a maximum output voltage for the machine as a function of the power in the wind, wherein said wind machine comprises a generator for converting said energy to electricity, the apparatus comprising:
   a. a field control for controlling the field voltage applied to the generator field winding;
   b. means for generating a feedback signal representing the output voltage of said generator at periodic intervals;
   c. means for comparing successive feedback signals to one another;
   d. means responsive to said comparing means for generating a signal to said field control for adjusting said field voltage by increments or decrements, whereby the direction of adjustment is in the same direction as the previous adjustment if said previous adjustment resulted in an increase in output voltage, and it is in the direction opposite to the previous adjustment if said previous adjustment resulted in a decrease in output voltage.

2. The control device as described in claim 1, wherein said means for comparing said feedback signal and said means for generating a signal to the field control are functions of a microprocessor.

3. The control device as described in claim 1 wherein said generator is an alternator.

4. The control device as described in claim 1 wherein said generator is a DC generator.

5. The control device as described in claim 1 and further comprising a means for selecting the initial field voltage as a function of the approximate wind speed and for generating a signal to said field control for initially adjusting said field voltage when operation of said wind machine is commenced.

6. A method for operating a wind machine at maximum efficiency by maintaining a maximum output voltage for the machine as a function of the power in the wind, wherein said wind machine comprises a generator for converting said energy to electricity and a field control for controlling the field voltage applied to the generator field winding, the method comprising:
   a. providing a feedback signal representing the output voltage of said generator at periodic intervals;
   b. comparing successive feedback signals to one another;
   c. generating a signal to said field control for adjusting said field voltage by increments or decrements, whereby the direction of adjustment is in the same direction as the previous adjustment if said previous adjustment resulted in an increase in output voltage, and it is in the direction opposite to the previous adjustment if said previous adjustment resulted in a decrease in output voltage.

7. A method as described in claim 6 and further comprising selecting the initial field voltage as a function of the approximate wind speed and generating a signal to said field control for initially adjusting said field voltage when operation of said wind machine is commenced.

* * * * *